Patented Nov. 22, 1927.

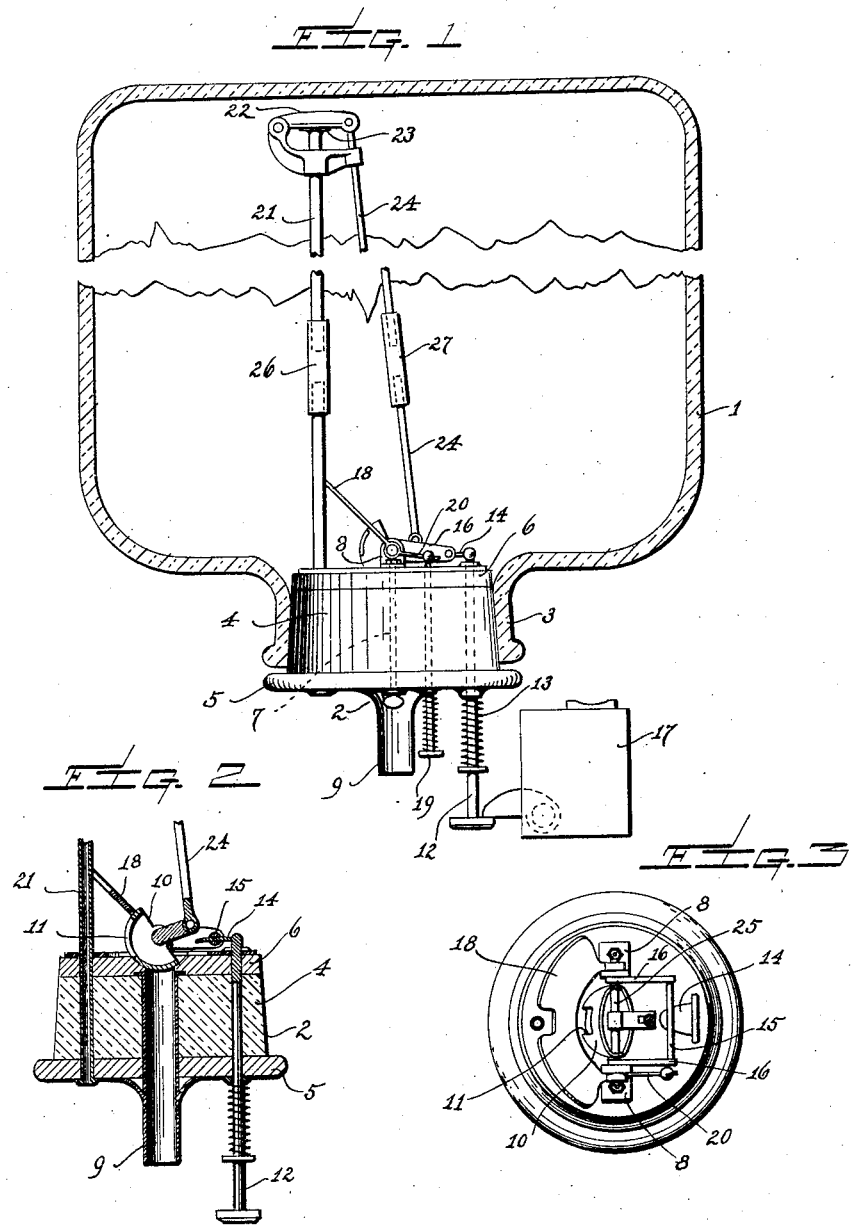

1,650,179

UNITED STATES PATENT OFFICE.

GRANT ABNER BANNISTER, OF BRIDGEPORT, CONNECTICUT.

DISPENSING APPARATUS.

Application filed January 30, 1922. Serial No. 532,563.

This invention has to do with dispensing apparatus and in particular it relates to an improved apparatus for dispensing liquids.

One of the objects of the invention is to provide a novel liquid dispensing machine which is particularly adapted to be employed in restaurants for the easy and efficient distribution of liquid foods by an attendant or by a purchaser.

Another object is to provide a liquid dispensing machine with an improved stopper which automatically regulates the air pressure on the surface of the liquid so that a uniform flow is obtained.

A further object of the invention is the provision of a new type of dispensing stopper for those liquid containers, which are usually inverted when in normal dispensing position. The stopper carries means for adjusting the flow valve to prevent leaking from wear or other causes, and to normalize the pressure on the top of the liquid by admitting air which has attained a temperature equal to that of the enclosed liquid, and it is also provided with means for agitating the liquid at any time.

Other objects of the invention will be appreciated from a reading of the detailed description.

In providing dispensing apparatus which is small, light, easily sterilized and as nearly automatic as possible for the purposes of distributing liquid foods in a restaurant, or for other purposes, many difficulties have been encountered especially in providing proper stoppers for containers which are adapted to be inverted. One of these difficulties is to automatically introduce air into the top of the bottle to prevent the formation of a vacuum which stops the flow of the liquid, and at the same time to materially reduce the cooling or heating effect of the air so introduced. Another difficulty is to provide a proper valve that entirely cuts off the flow of all liquids especially those of viscous nature and to have the valve so positioned within the container that the liquid near the valve would not be at a temperature different from the rest of the liquid, as is the case of a long neck container where a certain column of liquid of small volume would be exposed to atmospheric temperature and would soon be brought to a temperature different from that of the main body of the liquid.

A further difficulty encountered is that of providing an efficient means for agitating the liquid to reestablish the uniform specific gravity and to distribute small particles of solid food matter so that the majority of them will not be drawn off when the valve is first opened.

My invention therefore contemplates an improved liquid dispenser, heat insulated or otherwise, which is especially adapted for use in restaurants and one wherein all of the operating means are preferably carried on one member so that adjustments, replacements and sterilizing are readily accomplished. Although my apparatus is particularly adapted to dispense coffee, tea, iced or hot, milk, chocolate, flavoring syrups, soft drinks, soups and the like, it is desired to be understood that it may be employed for the dispensation of other fluids which may or may not be held in heat insulating containers. I also wish to have it clearly understood that my apparatus may be employed for many uses in the chemical industry.

The selected embodiment of my invention is illustrated in the accompanying drawings wherein;

Figure 1 is a side view of a dispensing apparatus showing the various parts carried by the stopper, Figure 2 is a sectional view of the stopper showing in detail some of the operating parts, and Figure 3 is a top plan view of the stopper.

Referring now to these drawings, the dispensing apparatus preferably consists of a container 1, adapted to be inverted for normal dispensing operations, and a stopper 2 for controlling the withdrawal of the liquid. The container shown is a plain glass bottle of cylindrical shape but it is exemplary of a metal, crock or vacuum container which may be constructed in any desired shape. The inner surface of the neck 3 is usually ground so that a more perfect fit with the stopper may be obtained and thus provide a tight non-leaking seal.

The stopper or head may be of any desired design to fit the container and perform the necessary controlling functions. It is preferred to have substantially all of the operating and controlling parts mounted on the stopper for the reasons above mentioned. The stopper illustrated consists of a body portion 4 of glass or other material, and when of glass it has its circumference ground for more securely fitting the neck 3. A metal or fibre portion 5, and a plate or washer 6 of cork or other like substance that is somewhat resilient, are placed on opposite surfaces of the glass. These three parts are suitably held together by rods 7 which have screw threaded engagement with metal angles 8. It may be desirable in certain instances to employ cork or other material instead of the glass, such changes are within the contemplation of my invention.

The material dispensed which is usually a liquid flows from the container to a cup or glass receptacle (not shown) through a flow tube 9 and the amount passing is governed by a valve 10 located within the liquid. It is preferred to have the valve positioned within the liquid instead of at the outer end of the flow tube as the liquid withdrawn will be of uniform temperature with the body of the liquid, and also such an arrangement of the valve prevents the settlement of heavier liquids or of food particles in positions which are not affected by an agitator or mixer.

The valve construction is preferably of the sliding type, and I have found that by making the valve 10 of hemispherical construction with an opening 11, that very satisfactory results are obtained when dispensing hot liquids or viscous liquids, or soups having solid food particles therein. The valve is journaled in the angles 8 and it slides on a seat formed in the cork washer 6. This construction permits adjustment of the pressure of the valve on the seat by operating the rods 7.

Suitable means for operating the valve is provided by a plunger 12 which extends through the stopper and is biased to its outer position by a spring 13. The inner end of the plunger carries a hinged tongue 14 adapted to be held in a slot in rod 15 which in turn is journaled in two arms 16 affixed to the valve. The upward movement of the plunger therefore oscillates the valve and allows opening 11 to register with the flow tube to form a passageway for the liquid.

When it is desired to place the dispensing apparatus in railway stations, or in the restaurants which have certain automatic dispensing devices, or elsewhere, a suitable coin control mechanism may be employed to govern the movement of the plunger 12. One form of coin control is shown at 17, only however, as an example. Such a mechanism does not form a part of my invention.

In dispensing certain types of liquid foods which, for instance, may be mixtures of liquids of substantially different specific gravities, it is desirable to have an agitator or mixer for remixing the liquid before dispensing. One means for accomplishing this end, I have shown in the form of an agitator or fin 18 journaled on a shaft carried by angles 8 and operated by a plunger 19 connected to an arm 20 attached to the agitator. A few strokes of this plunger will sufficiently remix the liquids or when liquids with food particles therein are being dispensed, it will throw the small food particles up into the body of the liquid so that the portion withdrawn will be consistent in density with the main body of the liquid and will not contain all food particles with a very little of the liquid.

One of the important features which assists in providing an efficiently operating apparatus is to include a means for normalizing the pressure on the top of the liquid so that the liquid flow will be easy and unrestrained. I have accomplished this result by providing an air conduit 21 extending from the stopper to a point near the base of the container where the air is freed above the top surface of the liquid. On the end of the conduit I provide a cap 22 having a cork or other resilient piece 23 for closing the end thereof. This cap is raised and lowered to admit air or to prevent air from passing out by means of an arm 24 connected to shaft 25 which is rotated by the movement of the valve 10. The cap also functions to keep the liquid from entering the tube as the stopper is being placed in the container before the latter is inverted into dispensing position.

The air which is freed above the liquid is usually of a temperature equal to that of the liquid within the container. It is easily seen that the length of the conduit and the diameter thereof are such that the air currents passing by the stopper will not materially move the air in the tube. Thus the small amount of heat given or taken from the liquid to bring the column of air to an equal temperature with the main body is negligible and does not materially change the temperature of the body of liquid. Should the air conduit be open at both ends then the air would be wafted into and out of the container according to the movement of the outside air currents and to the motion of the liquid inside the container. Such an arrangement would allow iced fluids to become warm and hot fluids to be cooled.

When operating my apparatus with the cap on the end of the conduit, I find that there is no detrimental change in the temperature of the fluid for a long period of time, and usually not within the time when all of the liquid would ordinarily be withdrawn. It will also be readily seen that the use of the cap is especially desirable when the liquid is held in a heat insulated container.

For purposes of adjusting the lengths of the conduit 21 and arm 24 so the stopper may be employed with nearly all sizes of standard containers, I have provided sleeves 26 and 27 which telescope on the ends of the conduit and arm. I may however employ the well known telescoping conduits to perform these particular functions.

The apparatus herein described as constituting an embodiment of my invention is simple in construction giving efficient and automatic operation of the parts, it maintains the liquid at desired temperature and permits the easy withdrawal of the fluid.

Modifications and changes may be made in the apparatus and method of co-operation of the parts, but such changes are considered as being within the scope of my invention as outlined in the following claims.

What is claimed is:

1. A dispensing apparatus comprising a suitable container for receiving a liquid to be dispensed, a stopper for closing an opening in said container, a valve carried by said stopper for controlling the flow of said liquid from said container, said valve being positioned on said stopper so as to extend into the main body of said liquid so that upon operation of said valve only liquid of the temperature of the main body of said liquid will be dispensed, and a mixer also carried by said stopper and adapted to be operated independently of the valve operating mechanism to agitate said liquid.

2. A dispensing apparatus comprising a suitable container for receiving a liquid to be dispensed and having a single opening therein, said container being adapted to be inverted during dispensing operations, a stopper for closing said opening, a valve mounted on said stopper and being held within the main body of said liquid, suitable means for operating said valve from the outside of said container, a member mounted on said stopper and in proximity to said valve for stirring said liquid, suitable independent means for operating said member, and an air inlet device carried by said stopper and arranged to admit air above the surface of said liquid, said device being so associated with said valve operating means that upon the opening of said valve there will be an admission of air above the surface of said liquid.

3. In a dispensing apparatus, a suitable container for holding a liquid to be dispensed, a stopper for closing an opening in said container, a valve for controlling the flow of said liquid from said container and having two parts that engage with each other to stop the flow of said liquid, one of said parts being of resilient nature to permit the other part to sink thereinto to form nonleaking engagement, a manually adjusting means associated with said valve for varying the pressure between the two parts and for making adjustments due to wear, and a flow tube for conducting the liquid to the exterior of said container after it has passed said valve.

4. A dispensing apparatus comprising a suitable container for holding a liquid to be dispensed and arranged to be inverted for dispensing, a suitable stopper for closing an opening in said container, a valve for govering the dispensing of said liquid, said valve being normally positioned in the main body of said liquid so that upon operation only liquid of the temperature of the main body of said liquid is permitted to flow from said container, said valve adapted to be removed from said container at will, an air inlet means associated with said valve for admitting air above the surface of said liquid whenever said valve is operated, an agitator carried by said stopper and being placed near said valve for purposes of stirring said liquid, a handle for operating said valve and said air inlet means, and a coin controlled mechanism for governing the movements of said handle.

5. In dispensing apparatus the combination of a gravity drain container, a dispensing valve positioned within said container for controlling the flow of material therefrom, means for supporting said valve, a flow tube associated with said valve for conducting the material from said container, means positioned within said container for agitating said material, and means for admitting air above the surface of said material, said air admitting means being associated with said material so that the air introduced thereabove will be of temperature substantially equal to that of the material.

6. In a dispensing apparatus the combination of a container provided with a single opening and adapted to be inverted for dispensing purposes, a stopper constructed to fit said opening, a dispensing valve carried by said stopper and arranged to normally be positioned within said container, an agitator normally held within said container and adapted to be operated to stir the material within said container, and an air inlet mechanism constructed to admit air above the surface of said material to permit the flow of the material from said container when said valve is operated.

7. In a dispensing apparatus the combination of a container adapted to be inverted, a stopper for engaging an opening in said container, a valve having sliding engagement with a portion of the surface of said stopper that engages the material to be dispensed, an agitator juxtaposed to said valve and carried by said stopper, and an air inlet means associated with said stopper for normalizing the air pressure on the surface of said material.

8. In a dispensing apparatus the combination of a container adapted to be inverted, a stopper for engaging an opening in said container, a valve having sliding engagement with a portion of the surface of said stopper that engages the material to be dispensed, an agitator juxtaposed to said valve and carried by said stopper, an air inlet means carried by said stopper for normalizing the air pressure at the surface of the material, and means on the exterior of said stopper for operating said valve, agitator and air inlet.

9. In a fluid dispensing apparatus the combination of a container having a single opening and adapted to be inverted for dispensing, a stopper for fitting said opening, means for mixing said fluid, means for controlling the flow of the fluid, and means for regulating the air pressure within said container.

10. In a fluid dispensing apparatus the combination of a container for holding the fluid to be dispensed and being arranged to be drained by gravity; and a stopper for closing an opening in said container and adapted to carry operating parts for controlling the flow of said liquid, said stopper consisting of a body portion for engaging said container, a resilient portion engaging one of the free surfaces of said body portion, a plate for engaging the other free surface of said body portion, and means for holding firmly together said body portion said resilient portion and said plate.

11. In a fluid dispensing apparatus a glass container for holding the fluid to be dispensed, a stopper having a ground glass part for fitting an opening formed in said container, a resilient part engaging said stopper and forming an exterior side thereof and being arranged to engage a portion of a valve carried by said stopper, a metal part also engaging said stopper and forming another exterior side thereof, a suitable valve arranged on said stopper, joining means passing through said stopper said resilient part and said metal part and having engagement with said valve and operating to hold said parts together and for adjusting the pressure of engagement between said resilient part and said valve, and means also passing through said stopper for operating said valve.

12. In a fluid dispensing apparatus a three part stopper having one of said parts of semi-resilient material and having a seat formed therein for receiving a spherically curved valve, an operating arm extending through said stopper for oscillating said valve on its seat.

13. In a fluid dispensing apparatus, a solid stopper, the outer surface of which is of slightly larger diameter than the inner surface at the opposite end of said stopper, a flow tube extending substantially through said stopper, and an oscillating valve associated with the inner surface of said stopper and adapted to connect and disconnect the main body of fluid in a container to which said stopper is attached with said flow tube.

14. In a fluid dispensing apparatus, a stopper having one surface of less diameter than that of another surface, a dispensing valve constructed to cooperate with the stopper surface of lesser diameter, a flow tube extending substantially through said stopper and positioned to receive the fluid freed by said valve, and a fluid agitating fin positioned near said valve to stir the fluid.

15. In a fluid dispensing apparatus a stopper adapted to close a container, an oscillating valve carried by said stopper and held within the liquid, an agitating fin positioned near said valve for agitating the fluid before it passes said valve, and plungers separately operated from the exterior of said container for actuating said valve and said fin.

16. In a fluid dispensing apparatus, a stopper composed of metal, glass and resilient materials in successive layers, a flow tube passing through said metal and glass materials, said resilient material having an opening registering with said flow tube, a hemispherical oscillating valve adapted to close the opening in said resilient material when in normal position, a spring pressed rod passing through said stopper and connected to said valve through compensating arms, said rod adapted to oscillate said valve, an agitator fin carried by said stopper and near said valve, and a separate spring pressed rod passing through said stopper for oscillating said fin to stir the liquid.

17. In a fluid dispensing apparatus a stopper composed of metal, glass and resilient materials in successive layers, a flow tube associated with said materials, said resilient material having an opening registering with said flow tube, a hemispherical valve for covering said opening, trunnions mounted on said resilient material for supporting said valve, rods extending from said metal material to said trunnions and adapted to be tightened to force said valve on to its seat, a fin held by said trunnions and adapted to be operated from the exterior of the apparatus for stirring the liquid before said valve is oscillated to its open position, an air conduit extending through and beyond said stopper, a cap for closing the end of said conduit, and an arm associated with said valve and said cap for raising said cap when said valve is operated.

Signed at Bridgeport, in the county of Fairfield and State of Connecticut, this 23rd day of January A. D. 1922.

GRANT ABNER BANNISTER.